July 18, 1961 F. RADOCY 2,993,096

ERASING MEANS FOR MAGNETIC RECORDING

Filed Sept. 25, 1956

INVENTOR
FRANK RADOCY

BY

Pennie, Edmonds, Morton, Barrows & Taylor
ATTORNEYS 2,993,096

ERASING MEANS FOR MAGNETIC RECORDING

Frank Radocy, Darien, Conn., assignor to Audio Devices, Inc., New York, N.Y., a corporation of New York Filed Sept. 25, 1956, Ser. No. 611,892
19 Claims. (Cl. 179—100.2)

This invention relates to magnetic recording and has for its object improvements in an apparatus for magnetic recording.

When sound is recorded on a piece of magnetic tape and the tape is wound into a roll, such as on a reel, each layer of the tape in the resulting roll is in the magnetic field of its neighboring layers. Since magnetic material placed in a magnetic field tends to be magnetized to some degree by it, each layer of tape is magnetized to some extent by its adjacent layers. For example, if a loud sound, such as a dog bark, or a gunshot, is magnetically recorded, preceded and followed by silence, and the tape is wound into a roll, some of that "sound" is transferred magnetically to adjacent layers of the tape. If the tape is then "played back," an echo of that sound will be heard before and after it. This is called magnetic printing, signal transfer, or print-through, etc.

Since the transfer or print-through occurs through a layer of plastic or paper, magnetically like air, the effect is small—of the order of 45 to 75 db below the signal. This seems to occur on all tapes, and is taken as an inherent limitation of magnetic recording. Even though layer to layer tape print-through is at a low level, it can be detected if the program conditions are right, the amplifier gain is turned way up, and one's ear is near the loudspeaker. A critical listener can, therefore, detect the dog bark, gunshot; or other appreciable signal, weak though it may be, in echoes.

Print-through is not confined, of course, to magnetically recorded loud sounds. Sounds of many gradations of intensity may be recorded and print-through occurs just the same. While the average listener may not be able to isolate and identify individual echoes, the sum total of them, fore and aft, may be enough to impair the quality of the main sound reproduced. It is less than a high fidelity rendition of the original sound program, the net result of which may make listening less of a pleasure than it should be.

My investigations have led to the discovery that print-through and its attendant disadvantages may be overcome for the most part.

I have found, for example, that a substantial reduction in print-through echo is possible by holding a stationary section of magnetized tape against a moving piece of tape being "played back." A test was made using a production tape with a coercive force, $H_c$, of 260 oersteds and a remanence, $B_r$, of 600 gauss. A small section of this tape was removed from the full reel and recorded with a saturating signal of a wave length of 7.5 mils. The remainder of the reel was recorded with a 1 kc. signal at a level of 3% total distortion, peak bias and 7½" per second tape speed. The 1 kc. signal was keyed in for one revolution in every six of the take-up roll or reel. The tape was played back one hour later with the small section of treatment-tape held stationarily against the moving tape from the reel. The reduction in print-through measured 6 db.

The 7.5 mils wave length recorded on the stationary section of treatment-tape used in the preceding test was chosen arbitrarily. An investigation was made to establish the most efficient wave length for this purpose. A standard production tape having magnetic properties previously described was recorded with a 1 kc. signal at saturation, peak bias and a tape speed of 7½" per second on every sixth layer of the take-up reel (this is standard procedure for print-through tests throughout this investigation). The tape was then used to test the print-through reduction properties of several small stationary treatment-tape pieces of the invention. Each treatment piece was recorded with a different wave length at saturation, peak bias and 7½" per second tape speed. The results are set out in Table I. It will be noted that the greatest print-through reduction is realized with a wave length of 7.5 mils; and that the amount of print-through reduction recedes at wave lengths greater than, as well as less than, 7.5 mils.

*Table I*

| Wave length in mils: | Reduction in 1 kc. print-through in db |
|---|---|
| 30 | 5 |
| 15 | 7 |
| 7.5 | 12 |
| 3.75 | 8 |
| 2.50 | 5 |
| 1.875 | 3 |
| 1.50 | 1 |
| .75 | 0 |
| .50 | 0 |

A test to determine the effects of treatment-tapes recorded at various wave lengths on the print-through from tapes recorded with different signals was performed. The results, tabulated below in Table II, indicate that the treatment-tape recorded with a wave length of 7.5 mils effects a greater reduction of the print-through of any frequency, than any other wave length.

*Table II*

| Wave Length On Treatment-Tape | Reduction in Print-Through, Freq.[1] | | |
|---|---|---|---|
| | .25 kc. | .5 kc. | 1 kc. |
| | db | db | db |
| 30 mils | 7 | 6 | 6 |
| 15 mils | 10 | 9 | 9 |
| 7.5 mils | 15 | 12 | 11 |
| 3.75 mils | 12 | 10 | 9 |

[1] Test frequencies recorded using standard procedures and tested immediately after recording.

All previous treatment-tapes of the invention were made by recording saturating wave lengths. A test was performed to investigate the effect of recording level on the efficiency of a treatment-tape. Three treatment-tapes were prepared each recorded with a wave length of 7.5 mils at different recording levels. Table III indicates that recording levels below saturation result in a loss of efficiency in reducing print-through.

*Table III*

| Recorded Level of 7.5 mils Treatment-Tapes | Reduction in 1 kc. Print-Through[1] |
|---|---|
| | db |
| Saturation | 11 |
| 10 db below saturation | 1 |
| 20 db below saturation | 0 |

[1] Test reel recorded using standard procedures.

Previous treatment-tapes of the invention have been constructed from standard red oxide production tapes having a coercive force of 260 oersteds and a remanence of 600 gauss. A test was performed to investigate the effectiveness of a tape having different magnetic properties. A black oxide tape with a coercive force of 390 oersteds, and a remanence of 1200 gauss, was secured.

Two treatment-tapes were constructed—one from standard red oxide tape and the other from the black oxide tape. Each was recorded with a saturating level at a wave length of 7.5 mils. A production test tape was prepared using standard procedures. Table IV indicates that the treatment-tape constructed from the black tape is far more efficient than the treatment-tape constructed from standard red tape.

*Table IV*

| Treatment-tape: | Reaction in print-through, db |
|---|---|
| Black tape | 19 |
| Standard red tape | 11 |

The 19 db reduction recorded in Table IV is quite drastic and tests were made to determine the effect of the treatment-tapes on a recorded high-frequency. Table V tabulates the results of these tests.

*Table V*

| Wave Length of Treatment-Tapes | Reduction in Print-Through | Loss in 15 kc. Signal |
|---|---|---|
| | *db* | *db* |
| 7.5 mils | 19 | 3 |
| 3.75 mils | 18 | 3 |
| 2.5 mils | 10 | 1 |
| 1.875 mils | 7 | .5 |
| 1.5 mils | 4 | 0 |

Table V indicates that it is possible to reduce print-through by 7 db, with a 1.875 mil treatment-tape, before a noticeable loss (0.5 db) in 15 kc. signal occurs.

The width of tape surface used in the construction of the treatment-tapes has been approximately ¼". Tests were made to determine the minimum amount of contact surface, on a treatment-tape, necessary to reduce print-through efficiently. Table VI is the result of this study.

*Table VI*

| Width of treatment-tape: | Reduction in print-through, db |
|---|---|
| ¼" | 11 |
| ⅛" | 11 |
| 1/16" | 4 |
| 1/32" | 2 |

Table VI indicates that the minimum width for an efficient treatment-tape is ⅛".

A study was made to determine the effect of the coercive force of test tapes on the efficiency of a treatment-tape. A series of test tapes was prepared ranging in coercive force from 210 to 390 oersteds. These tapes were recorded using standard test procedures and tested for print-through reduction six days later. The treatment-tape was constructed from the black tape previously described. The results shown in Table VII indicate that the efficiency of the treatment-tape of the invention is reduced as the coercive force of the test tape approaches that of the treatment-tape.

*Table VII*

| Coercive force of test tapes: | Reduction in print-through in db |
|---|---|
| 210 | 8 |
| 230 | 5 |
| 260 | 4 |
| 290 | 3 |
| 320 | 3 |
| 350 | 2 |
| 375 | 2 |
| 390 | 1 |

The life of the treatment-tape was extremely short due to the abrasive action of the test tapes. Many designs and devices were constructed to improve the wear resistance of a test tape including bar magnets, revolving spindles, protective coverings, and oxide-coated brass shims. However, none of these proved completely satisfactory. Finally a design was developed that appeared to be satisfactory. This involved milling out a section of bar stock and cementing a treatment-tape in the milled area. The test tape was kept from contacting the full width of the treatment-tape by the unmilled section of the bar stock. However, enough contact was allowed to allow the full demagnetizing effect of the treatment-tape.

It is current knowledge that "print-through" increases with time. Tests were performed using a treatment-tape constructed with black oxide tape, having properties previously described, to study the effect of "print-through" reduction versus time on a production tape. The results are tabulated in Table VIII.

*Table VIII*

| Time after recording: | Reduction in print-through, db |
|---|---|
| 1 hour | 19 |
| 24 hours | 8 |
| 72 hours | 7 |
| 1 year | 6 |

The results shown in Table VIII indicate that the treatment-tape used for the test gives satisfactory "print-through" reduction after one year. However, the 19 db reduction noted after one hour is much too severe since it also reduces the 15 kc. signal 3 db. The need for a treatment-tape that can be used after any given time period was apparent. It was decided, for present purposes, to use a two-sided device, each side being identified in some fashion, such as by color or shape.

These and other features of the invention may be better understood by referring to the accompanying drawing, taken in conjunction with the following description, in which FIG. 1 is a diagrammatic plan view of a conventional magnetic tape recorder, which is adapted for recording, erasing, and playing-back signals, showing a treatment-tape device illustrative of a practice of the present invention mounted in operative position on the deck of the recorder in the path of travel of the tape-to-be-played as it moves from a supply reel, past a play-back head, to a take-up reel;

Figures 2, 3, 4, 5, 6, 7, 8, 9:
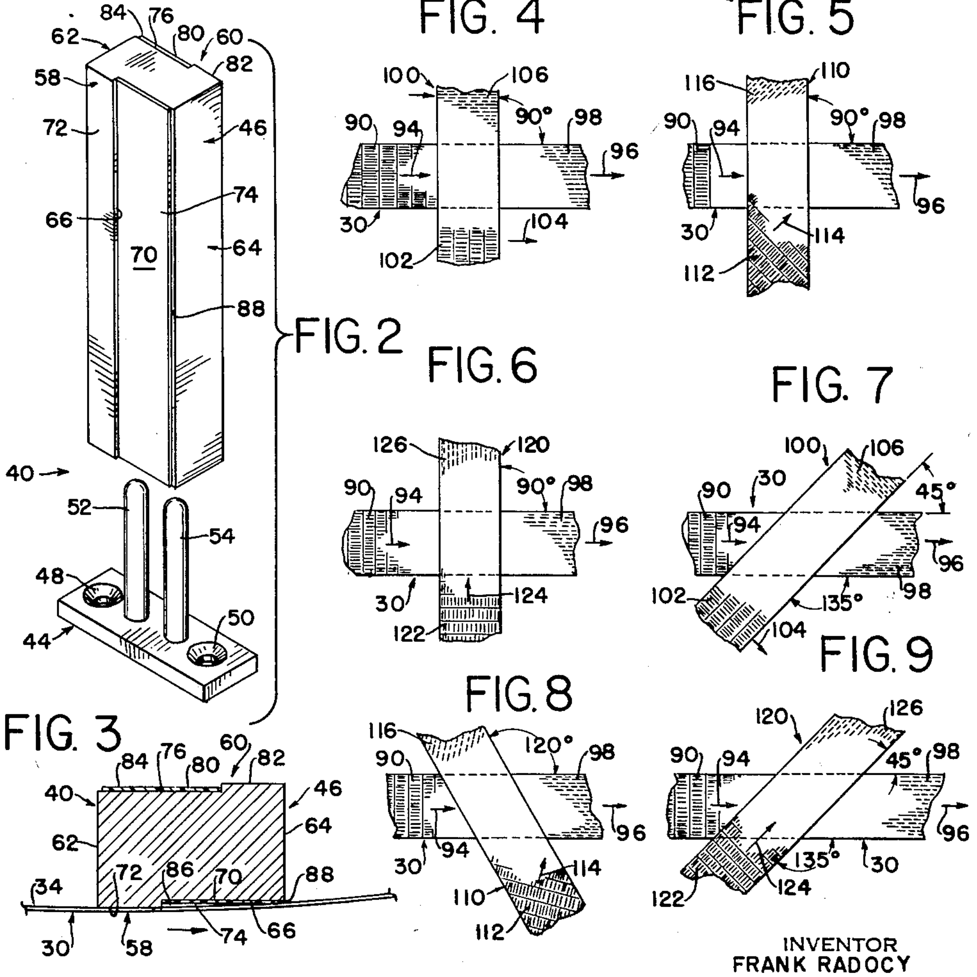
FIG. 2 is an enlarged exploded and perspective view of the tape treatment device shown in its normally upright position.
FIG. 3 is an enlarged sectional view showing the tape-to-be-treated in wiping contact with the treatment device.

FIG. 4 is a diagrammatic side elevation of a piece of treatment-tape with a piece of tape-to-be-treated crossing thereover at a right angle, the recording direction of the frequency pulses of the treatment-tape being parallel to the recording direction of the frequency pulses of the tape-to-be-treated, the particles of iron oxide in the coating of the tape-to-be-treated being oriented in its direction of travel, the same as the recording directions of the two pieces of tape, and the particles of iron oxide in the coating of the treatment-tape being oriented in the same direction as the recording direction of the treatment-tape;

FIG. 5 is a similar side elevation, the recording direction of the treatment-tape being at an oblique angle, specifically 45°, to the recording direction of the tape-to-be-treated, and the particles of iron oxide in the coating of the treatment-tape being oriented in the same direction as the recording direction of the treatment-tape;

FIG. 6 is a similar side elevation, the recording direction of the treatment-tape being at a right angle to the recording direction of the tape-to-be-treated, and the particles of iron oxide in the coating of the treatment-tape being oriented in the same direction as the recording direction of the treatment-tape; and FIGS. 7, 8 and 9 are side elevations similar to FIGS.

4, 5 and 6, respectively, showing the treatment-tapes tilted in their planes with respect to the tape-to-be-treated.

Figure 1:
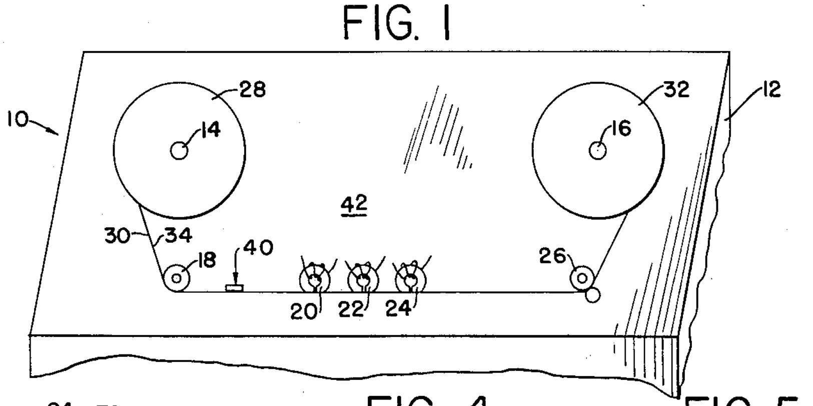

Referring to FIG. 1, it shows diagrammatically a magnetic sound recorder 10 formed of a box 12 provided with the usual mechanism to record, erase and play back signals, including a supply reel spindle 14 and a take-up reel spindle 16 spaced a suitable distance apart to provide ample space for a stabilizing capstan 18, an erase head 20, a recording head 22, a play-back head 24, and a driving capstan 26. A supply reel 28 of magnetic sound recording tape 30 is mounted on its spindle and a take-up reel 32 is mounted on its spindle, the tape being strung around the first capstan, across the gaps of the three magnetic heads, around the second capstan and on the take-up reel. In the instant arrangement the magnetic coating 34 of the tape is on the far side of the tape, that is, immediately next to the capstans and the gaps of the magnetic heads as one views FIG. 1.

FIG. 1 also shows a tape treatment device 40 of the invention conveniently mounted on the deck 42 of the recorder in the path of travel of the tape between the first capstan and the first magnetic head. The magnetic heads are usually located under a common housing, not shown, for their protection against blows and the accumulation of dust. The device of the invention would therefore be located between the housing and the first capstan; and on the far side of the tape so that its magnetic coating is brought into wiping engagement with the device.

The tape treatment device of the invention is shown to better advantage in FIG. 2. It is divided into two interconnecting and disengageable parts: one a base plate 44 and the other a wiping member 46. For excellent wear and service, they are presently made of chromium plated brass. In the instant construction the base plate is provided with a pair of spaced screw holes 48 and 50 to allow permanent installation on the deck of the recorder box. A pair of spaced upright steel positioning pins 52 and 54 are integrally secured to the base plate and are adapted to fit snugly into a pair of complementary holes, not shown, in the bottom portion of the wiping member.

Still referring to FIG. 2, the wiping member is in the shape generally of an elongated rectangular prism with relatively broad sides 58 and 60, and fairly narrow ends 62 and 64. The right portion of front side 58 is milled to provide a recess 66 into which a piece of treatment-tape 70 is integrally secured. The side thus presents a slightly protruding metal bearing surface 72, generally rectangular in shape, and a recessed tape wiping surface 74, also generally rectangular in shape. As will be shown more fully below, the magnetic coating of the tape will slide against the metal bearing surface and the tape wiping surface, as it follows its normal path of travel to the play-back head, from left to right as one views FIGS. 1 and 2. The left portion of back side 60 also is milled to provide a recess 76 into which a piece of treatment-tape 80 is integrally secured. The back side thus presents a slightly protruding metal bearing surface 82, generally rectangular in shape, and a recessed tape wiping surface 84, also generally rectangular in shape.

It will be noted that, as one views FIG. 2, metal bearing surfaces 72 and 82, and tape wiping surfaces 74 and 84, are diagonally opposed to each other. Since wiping member 46 may be pulled away from base plate 44, and hence away from positioning pins 52 and 54, it may be turned 180° and again mounted on the positioning pins; thus presenting metal bearing surface 82 and tape wiping surface 84 to the passing magnetic coating 34 of the tape.

In an instant construction, the wiping member is 1½" in height, ⅜" in width and ¼" in thickness. The main body of the wiping member is formed of a nonmagnetic material having excellent resistance to the abrasive action of the magnetic coating of the tape to be treated. Brass is presently preferred, because it offers excellent workability for machining and subsequent chromium plating, which provides wear resistance. The main body of the wiping member is milled out to a depth of .010" and a width of .257" along its length or height. The unmilled section, about ⅛" wide, has a metal bearing surface for the tape-to-be-treated. The treatment-tape is .247" wide and is cemented into the milled recess leaving a space of .010" between the outer edge of the tape and the outer edge of the front side of the wiping member. This space helps to prevent damage to the treatment-tape during handling.

Referring next to FIG. 3, tape 30 is shown being drawn from left to right across and in sliding engagement with tape treatment device 40, again from left to right as one views the figure. The magnetic coating 34 of the tape bears against metal bearing surface 72, is drawn across a gap 86 between the tape and treatment-tape 70, is brought in wiping engagement with the magnetic coating of about the right-half of the treatment-tape, and is drawn across the right edge portion 88 of wiping member 46. Since the metal bearing surface extends into the path of travel of the tape, it takes most of the thrust of the tape, thus saving on wear and tear of the treatment-tape.

As already indicated, there is some latitude in the structure of the treatment-tape. The red iron oxide, gamma $Fe_2O_3$, tape presently used has a coercive force of 325 oersteds and a remanence of 800 gauss. It is designed for use on newly recorded tapes. It will reduce print-through 6–8 db on a newly recorded Audiotape brand of magnetic recording tape without any appreciable loss in high frequency response. The black iron oxide, ferrosoferric or magnetite, $Fe_3O_4$, tape presently used has a coercive force of 390 oersteds and a remanence of 1200 gauss and is designed for use on tapes that have been recorded no less than 48 hours previous to treatment.

Also as indicated, both tapes have been recorded with a wave length of 7.5 mils. The recording has been made at an angle of 45° to the direction of travel of the tape to eliminate the possibility of printing an audible signal on the tape being treated. This recording angle effect may be obtained in several ways, as illustrated diagrammatically in FIGS. 4 to 9.

As tapes are made today, the magnetic iron oxide particles in the coating are oriented usually in the direction of travel of the tape base. This is true whether the particles are acicular or not. Also, the frequency pulses are recorded in the direction of travel of the tape.

FIGS. 4–9 illustrate in brief detail a piece of tape-to-be-treated 30. Its frequency pulses or magnetic patterns 90 are shown, in part to the left, recorded in the direction of arrow 94; which is the same as the direction of travel of the tape, indicated by arrow 96. Its iron oxide particles 98, whether acicular or not, are shown, in part to the right, oriented in the same direction of travel. In other words, the direction of recording, the direction of orientation and the direction of travel are the same. For convenience, the frequency pulses and the iron oxide particles are shown facing the viewer, although in use they are on the reverse side of the tape, in the coating facing the coating of the treatment-tapes.

FIG. 4 illustrates a treatment-tape 100 of the invention. It is shown disposed at an angle of 90° to tape-to-be-treated 30 and to its direction of travel 96. The treatment-tape is provided with signal frequency pulses 102, shown in part, specially recorded in the direction of arrow 104; the recording direction being parallel to recording direction 94, the direction of orientation of iron oxide particles 98, and direction of travel 96, of the tape-to-be-treated. Iron oxide particles 106 of the treatment-tape are oriented in the same direction as recording direction 104; which also coincides with recording direction 94, the direction of orientation of iron oxide particles 98, and direction of travel 96, of the tape-to-be-treated. Such a treatment-tape, particularly when used in conjunction with such a tape-to-be-treated, provides a maximum amount of magnetically impressed energy; but it has the disadvantage of causing audible contact printing in the tape-to-be-treated if the latter is inadvertently left in stationary contact with the former. As will be noted from FIG. 4, frequency pulses 90 and 102 are parallel to each other, their recording directions 94 and 104 being the same, and when they are held in coating surface-to-surface contact with each other for any length of time, magnetic energy from the more powerfully energized treatment-tape is transferred to the tape-to-be-treated. For that reason the embodiment about to be described is preferred; it avoids audible contact printing under such circumstances.

FIG. 5 illustrates a treatment-tape 110 of the invention. Like that of FIG. 4, it is shown at an angle of 90° to tape-to-be-treated 30 and to its direction of travel 96. The treatment-tape is provided with signal frequency pulses 112, shown in part, specially recorded in the direction of arrow 114; the recording direction being at an angle of 45° to recording direction 94, the direction of orientation of iron oxide particles 98, and direction of travel 96, of the tape-to-be-treated. Iron oxide particles 116 of the treatment-tape are oriented in the same direction as recording direction 114; which is also at an angle of 45° to recording direction 94, the direction of orientation of iron oxide particles 98, and direction of travel 96, of the tape-to-be-treated. While such a treatment-tape, particularly when used in conjunction with such a tape-to-be-treated, provides less magnetically impressed energy than the treatment-tape of FIG. 4, it is not subject to the disadvantage of audible contact printing, discussed above, if the two pieces of tape are left inadvertently in stationary contact with each other. As will be noted from FIG. 5, frequency pulses 90 and 112 are at an oblique (acute or obtuse) angle to each other (depending on how the angle is measured with respect to its base lines, the recording directions of frequency pulses 94 and 114), their recording directions 94 and 114 being at the same angle to each other, and when they are held in coating surface-to-surface contact with each other the contact print is misaligned in relation to the gap in the play-back head, thereby reducing the contact print signal to inaudibility. While the specific embodiment of FIG. 5 features the 45° angle mentioned (the angle between recording directions 94 and 114), it will be clear that any other acute or obtuse angle may be employed, any angle less or more than 90°; an angle of 90° being ineffective, as is pointed out for the arrangement of FIG. 6.

FIG. 6 discloses a "treatment-tape" 120 which is not effective in erasing print-through; that is in the particular arrangement shown. Like that of FIGS. 4 and 5, the treatment-tape is shown at an angle of 90° to tape-to-be-treated 30 and to its direction of travel 96. The "treatment-tape" is provided with signal frequency pulses 122, shown in part, specially recorded in the direction of arrow 124; the recording direction being at an angle of 90° to recording direction 94, the direction of orientation of iron oxide particles 98, and direction of travel 96, of the tape-to-be-treated. Iron oxide particles 126 of the "treatment-tape" are oriented in the same direction as recording direction 124, and at an angle of 90° to recording direction 94, the direction of orientation of iron oxide particles 98, and direction of travel 96, of the tape-to-be-treated. When recording directions 94 and 124 are at right angles to each other, the magnetic lines of force in frequency pulses 90 and 122 are also at right angles to each other, and those in pulses 122 are thereby placed in a position to make them ineffective in reducing print-through in the tape-to-be-treated. As will be pointed out below, however, a slight shift in the arrangement of FIG. 6 will make the treatment-tape effective for that purpose.

While FIGS. 4, 5 and 6 show iron oxide particles 106, 116 and 126 of treatment-tapes 100, 110 and 120, respectively, to be oriented, they need not be oriented. However, resort to orientation gives a further control over the power of the treatment-tapes. Since it is common practice to orient the iron oxide particles in the tape-to-be-treated, it becomes relatively simple also to orient the particles in the treatment-tapes.

While FIGS. 4, 5 and 6 show tape-to-be-treated 30 as being drawn over, and in wiping contact with, treatment-tapes 100, 110 and 120 at right angles to each other, their positions may be shifted relatively to each other. Thus, in the case of FIG. 4, treatment-tape 100 may be tilted or turned in its own plane so that its recording direction 104 is at any desired acute or obtuse angle to recording direction 94 of tape-to-be-treated 30. Such a shift is shown in FIG. 7, like numerals being used for the corresponding pieces of tape. It will be noted that the shift from the vertical amounts to 45°; that is, recording direction 94 of the tape-to-be-treated is now at an angle of 45° (or 135°, depending on whether the acute or the obtuse angle is measured), to recording direction 104 of the treatment-tape. It will also be noted, however, that the direction of orientation of iron oxide particles 106 of the treatment-tape is no longer parallel to the direction of orientation of iron oxide particles 98 of the tape-to-be-treated; their directions of orientation being shifted relatively to each other in the same amount as the recording directions of the two pieces of tape. The arrangement of FIG. 7 overcomes the disadvantage discussed under FIG. 4 above; that is audible contact printing on the tape-to-be-treated is avoided when the two pieces of tape are held together stationarily for any length of time.

In similar fashion, in the case of FIG. 5, treatment-tape 110 may be tilted or turned in its own plane so that its recording direction 114 is at any desired acute or obtuse angle, other than 45° (135°), to recording direction 94 of tape-to-be-treated 30. Such a shift is shown in FIG. 8, like numerals being used for the corresponding pieces of tape. It will be noted that the shift from the vertical amounts to 30°; that is recording direction 94 of the tape-to-be-treated is now at an angle of 75° (105°, depending on whether the acute or the obtuse angle is measured), to recording direction 114 of the treatment tape. It will also be noted, however, that the direction of orientation of iron oxide particles 116 of the treatment-tape are no longer at an angle of 45° to the direction of orientation of iron oxide particles 98 of the tape-to-be-treated; their directions of orientation being shifted relatively to each other in the same amount as the recording directions of the two pieces of tape. The arrangement of FIG. 8 is not quite as effective as that of FIG. 5, but it is, nevertheless, highly useful in reducing print-through.

In similar fashion, in the case of FIG. 6, treatment-tape 120 may be tilted or turned in its own plane so that its recording direction 124 is at any desired acute or obtuse angle to recording direction 94 of tape-to-be-treated 30. Such a shift is shown in FIG. 9, like numerals being used for the corresponding pieces of tape. It will be noted that the shift from the vertical amounts to 45°, that is recording direction 94 of the tape-to-be-treated is now at an angle of 45° (135°, depending on whether the acute or the obtuse angle is measured), to recording direction 124 of the treatment-tape. It will also be noted, however, that the direction of orientation of iron oxide particles 126 of the treatment-tape is no longer at an angle of 90° to the direction of orientation of iron oxide particles 98 of the tape-to-be-treated; their directions of orientation being shifted relatively to each other in the same amount as the recording directions of the two pieces of tape. Whereas the arrangement of FIG. 6 is ineffective in reducing print-through, as pointed out above, that of FIG. 9 is very effective for the purpose.

In the manufacture of magnetic recording tape, a relatively wide and elongated piece of non-magnetic tape base, such as paper or one of the plastics, is coated with a liquid binder loaded with magnetic oxide of iron, such as ferrosoferric or gamma iron oxide; the iron oxide particles are oriented lengthwise of the tape base; solvent is evaporated from the binder to dry the coating; and the coated tape base is slit lengthwise into a plurality of pieces of tape ¼ inch wide. Treatment-tapes may be obtained from such narrow pieces of tape. To this end signals of the desired frequency are magnetically recorded in a predetermined direction on the pieces of tape. The gap of the recording head for the purpose may be biased with respect to the direction of travel of the tape to obtain the desired recording direction. In the case of FIGS. 5 and 8, for example, the head and its gap would be biased at an angle of 45° to the longitudinal length of the tape. In the case of FIGS. 4 and 7 the head gap would be parallel to the longitudinal length of the tape, and the tape would be drawn transversely across the gap. And in the case of FIGS. 6 and 9, the head gap would be a right angle to the longitudinal length of the tape. These variants apply only to the recording directions of the frequency pulses.

If full advantage is to be taken of the control that can be obtained by using properly oriented particles of iron oxide, or other suitable magnetic material, it may be desirable to start with coated tape base before it is slit into the ¼ inch pieces. Since the direction of orientation of the iron oxide particles is known, treatment-tape strips may be cut from the coated tape base in a direction to correspond with any recording direction to be used in impressing the frequency pulses. See for example the treatment-tapes of FIGS. 4 and 7, and of FIGS. 5 and 8.

What is important in reducing print-through is that the coercive force of the treatment-tape be greater than that of the tape-to-be-treated. The red and black oxide tapes mentioned are highly desirable because of their specific characteristics, which allow one to control the degree of print-through reduction or demagnetizing effect.

Control of the demagnetizing effect of the treatment-tape may be achieved in such ways as the following:

(1) The distance between the treatment-tape and the tape-to-be-treated can be varied by the depth of the milled recess in the wiping member. The greater the separation of the tapes, the less is the demagnetizing effect.

(2) The coercive force of the treatment-tape can be varied. The less its coercive force, the less is its demagnetizing effect.

(3) The remanence of the treatment-tape can be varied. The less its remanence, the less is it demagnetizing effect.

(4) The signal recorded on the treatment-tape can be varied in level. The lower the level, the less is the demagnetizing effect.

(5) The wave length of the signal recorded on the treatment-tape can be varied. As the wave length is varied from the "critical wave length" (7.5 mils in the case of the black oxide tape), the demagnetizing effect becomes weaker.

(6) As pointed out above, the demagnetizing power of the treatment-tape can be varied by varying the direction of orientation of its iron oxide particles.

As shown in FIG. 2, each piece of treatment-tape is suitably cemented in its recess in the wiping member. While two such recesses are shown, one or more can be employed, depending on the number of sides of the wiping member. If the member were a square in cross-section, for example, it would present four sides; in which case the base and positioning pins would be arranged accordingly. In the case of the present wiping member, two pieces of treatment-tape are employed, one with red oxide and the other with black oxide, so that an operator has a choice, depending upon the amount of demagnetization he desires to effect in the tape-to-be-treated.

Although such magnetic iron oxides are presently preferred for the treatment device, other magnetic materials should not be overlooked, such as, for example, the so-called "35 Cobalt Steel" and "36 Cobalt Steel," composed of iron, carbon, cobalt, chromium and tungsten; so-called "Remalloy (Comol)," composed of cobalt, molybdenum and iron; so-called "Vicalloy," composed of cobalt, vanadium and iron; powdered iron; ferrites of various kinds; powdered iron-cobalt; iron oxide, cobalt coprecipitate; etc. The treatment device may be formed of a solid bar of suitable magnetic material, a coating of the material in powdered form may be used; etc.

In the above description the signals to be reduced, or erased, are stated to be on tape of the conventional type. It will be clear, however, that this may be true of other recording media, such as metal tape or wire; forms other than tape containing coatings of magnetic material, for example, continuous bands of substantial width; etc.

While the reduction or erasing of print-through echoes is described in some detail, the invention also contemplates a treatment device that would be effective in erasing all recorded signals on the medium to be treated; that is it is not confined to print-through echoes. As stated and shown in the tables above, the treatment-device may have enough energy not only to reduce the echo signals but other signals as well. By providing a treatment-device of sufficient energy, all signals on the tape-to-be-treated may be erased, thus making unnecessary the use of the usual erase head on magnetic recorders and the consequent disadvantages of such use.

It will be clear to those skilled in this art that other useful modifications may be adopted in the practice of the invention.

I claim:

1. In apparatus for reducing print-through signals on magnetic recording tape while the tape is in transit between a supply roll and the play-back head of a magnetic tape recorder, the improvement comprising a tape-treatment device provided with a continuous magnetic side to be placed in immediate proximity to and in sliding contact with the magnetically coated side of the tape-to-be-treated when advancing in its normal path of travel between said supply roll and play-back head, the magnetic side of the tape-treatment device having a higher coercive force than the tape-to-be-treated and having signals magnetically recorded in a predetermined direction on the magnetic side thereof, means for mounting the tape-treatment device so that said predetermined direction of the signals thereon are at an angle other than 90° to the direction of the signals on the tape-to-be-treated.

2. Apparatus according to claim 1, in which the side of the tape-treatment device is formed of metal.

3. Apparatus according to claim 1, in which the side of the tape-treatment device is formed of finely divided particles of magnetic material.

4. Apparatus according to claim 1, in which the side of the tape-treatment device is formed of finely divided particles of magnetic material, and the particles of magnetic material are oriented in the recording direction of the treatment signals.

5. Apparatus according to claim 1, in which the side of the tape-treatment device is formed of finely divided particles of magnetic oxide of iron.

6. Apparatus according to claim 1, in which the side of the tape-treatment device is formed of finely divided particles of magnetic oxide of iron, and the particles of iron oxide are oriented in the recording direction of the treatment signals.

7. Apparatus according to claim 1, in which the side of the device is divided into two adjacent areas: the first area being a non-magnetic bearing surface to be brought initially into sliding contact with the magnetic surface of the tape-to-be-treated; and the second area being provided with said treatment signals to be brought into wiping engagement with the magnetic surface of the tape-to-be-treated to demagnetize the same in controlled amount.

8. Apparatus according to claim 7, in which the second area is recessed with respect to the first area.

9. Apparatus according to claim 7, in which the second area is recessed with respect to the first area, and a piece of treatment-tape is integrally secured in the recess, the exterior surface of the treatment-tape being coated with finely divided magnetic material.

10. Apparatus according to claim 7, in which the second area is recessed with respect to the first area, and a piece of treatment-tape is integrally secured in the recess, the exterior surface of the treatment-tape being coated with finely divided magnetic oxide of iron.

11. Apparatus according to claim 7, in which the second area is recessed with respect to the first area, and a piece of treatment-tape is integrally secured in the recess, the exterior surface of the treatment-tape being coated with finely divided ferrosoferric oxide.

12. Apparatus according to claim 7, in which the second area is recessed with respect to the first area, and a piece of treatment-tape is integrally secured in the recess, the exterior surface of the treatment-tape being coated with finely divided gamma ferric oxide.

13. Apparatus according to claim 7, in which the second area is recessed with respect to the first area, and a piece of treatmen-tape is integrally secured in the recess, the exterior surface of the treatment-tape being coated with finely divided magnetic material, and the particles of magnetic material are oriented in the recording direction of the treatment signals.

14. Apparatus according to claim 7, in which the second area is recessed with respect to the first area, and a piece of treatment-tape is integrally secured in the recess, the exterior surface of the treatment-tape being coated with finely divided magnetic oxide of iron, and the particles of magnetic material are oriented in the recording direction of the treatment signals.

15. Apparatus according to claim 7, in which the second area is recessed with respect to the first area, and a piece of treatment-tape is integrally secured in the recess, the exterior surface of the treatment-tape being coated with finely divided ferrosoferric oxide, and the particles of magnetic material are oriented in the recording direction of the treatment signals.

16. Apparatus according to claim 7, in which the second area is recessed with respect to the first area, and a piece of treatment-tape is integrally secured in the recess, the exterior surface of the treatment-tape being coated with finely divided gamma ferric oxide, and the particles of magnetic material are oriented in the recording direction of the treatment signals.

17. Apparatus according to claim 7, in which the tape-treatment device includes a wiping member and a base to support the same, the wiping member containing said bearing and wiping surfaces and being connectible with the base.

18. Apparatus according to claim 7, in which the tape-treatment device includes a wiping member and a base to support the same, the wiping member containing said bearing and wiping surfaces and being connectible with the base by a plurality of spaced positioning pins secured to the base.

19. Apparatus according to claim 7, in which the tape-treatment device is secured to a magnetic tape recorder in immediate proximity to and in sliding contact with the magnetically coated side of the tape-to-be-treated when advancing in its normal path of travel between said supply roll and play-back head on the recorder.

References Cited in the file of this patent

UNITED STATES PATENTS

| | | |
|---|---|---|
| 2,526,358 | Howell | Oct. 17, 1950 |
| 2,610,257 | Wissmann | Sept. 9, 1952 |
| 2,635,149 | Cain | Apr. 14, 1953 |
| 2,653,189 | Camras | Sept. 22, 1953 |

FOREIGN PATENTS

| | | |
|---|---|---|
| 685,227 | Great Britain | Dec. 31, 1952 |
| 881,343 | France | Jan. 22, 1943 |